UNITED STATES PATENT OFFICE.

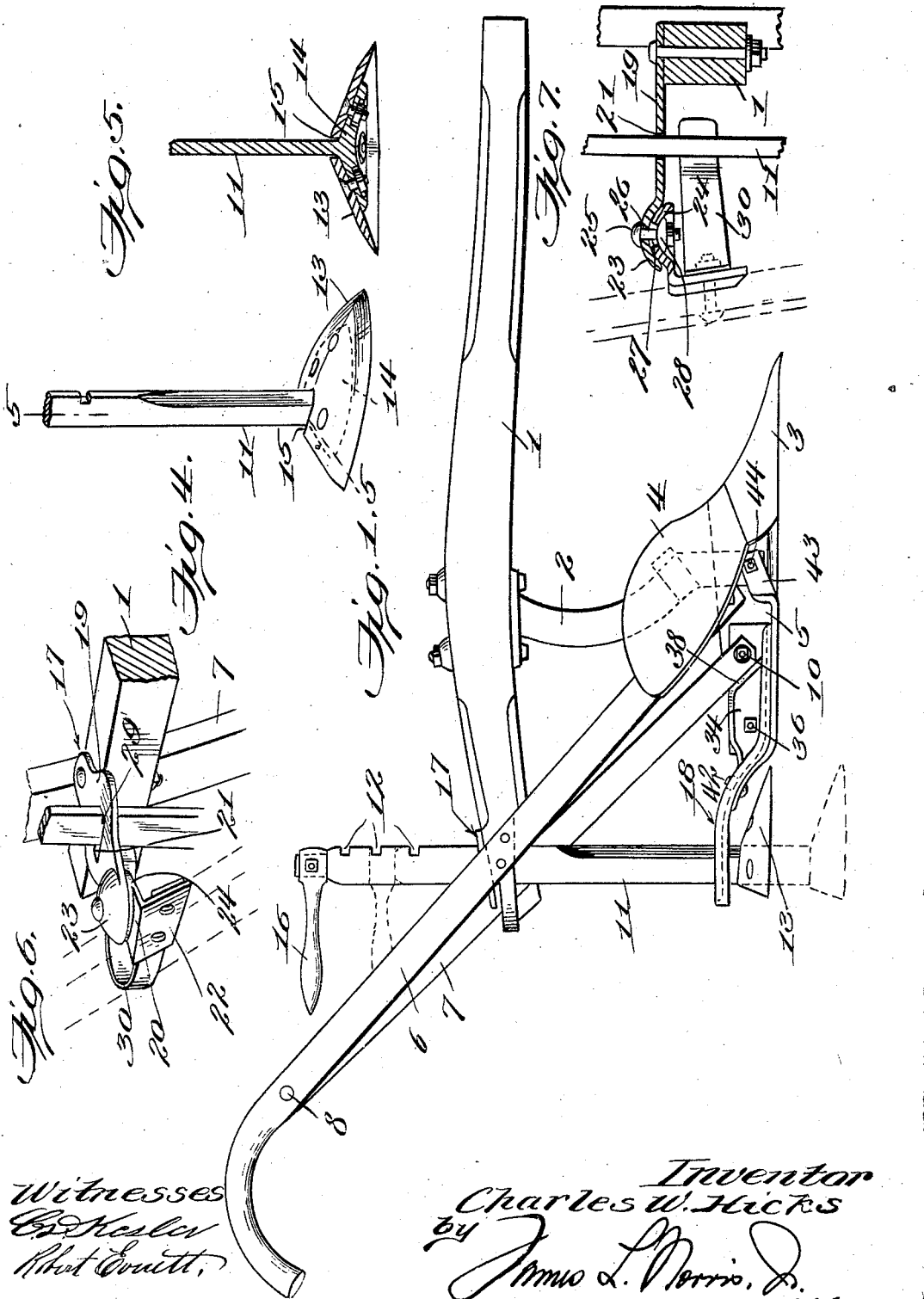

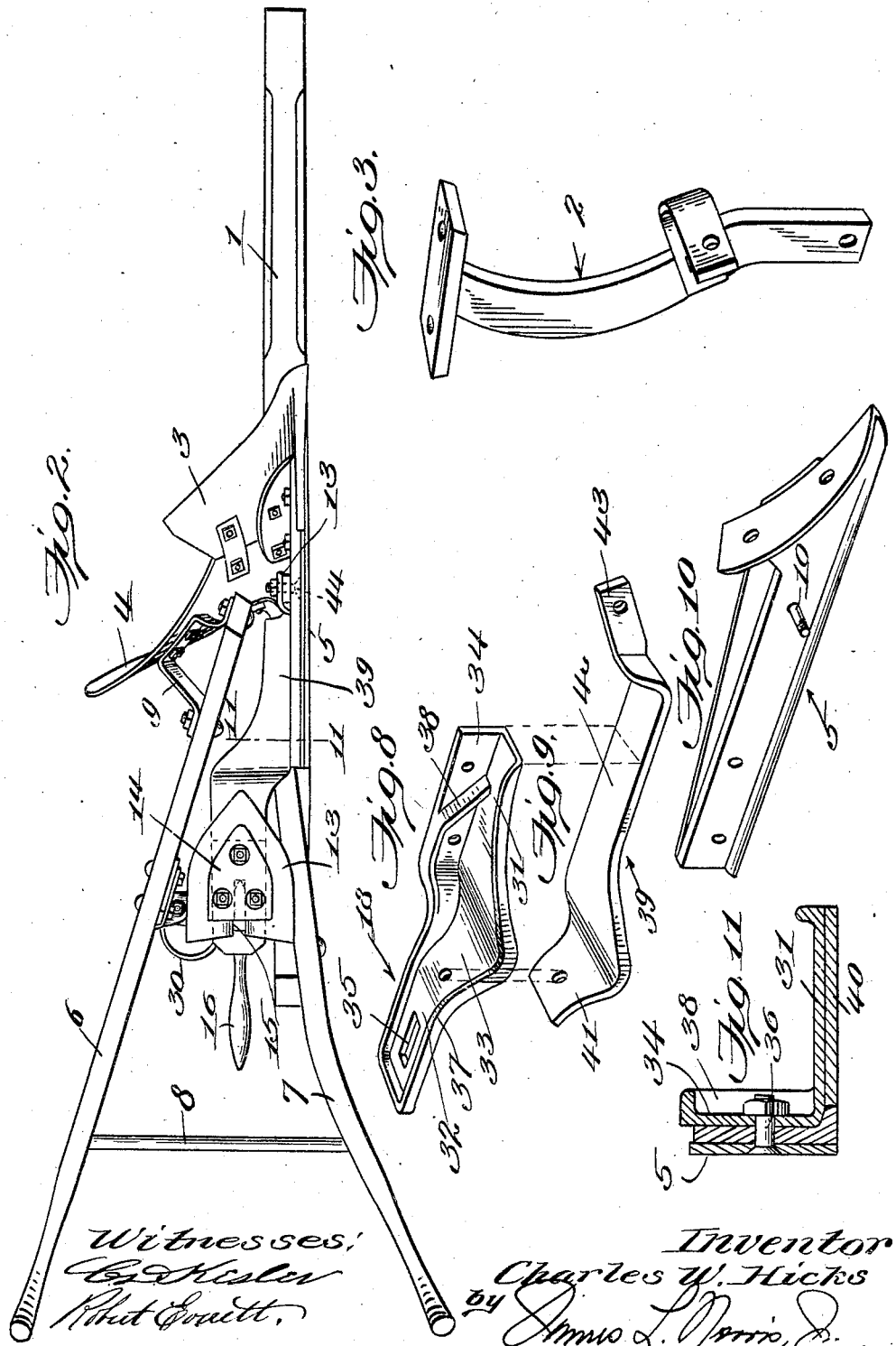

CHARLES W. HICKS, OF SUTHERLAND, FLORIDA.

SUBSOIL-PLOW.

991,306.  Specification of Letters Patent.  Patented May 2, 1911.

Application filed January 13, 1911. Serial No. 602,439.

*To all whom it may concern:*

Be it known that I, CHARLES W. HICKS, a citizen of the United States, residing at Sutherland, in the county of Hillsboro and State of Florida, have invented new and useful Improvements in Subsoil-Plows, of which the following is a specification.

The present invention has reference to sub-soil plows, and particularly to plows equipped with sub-soil attachments of the type shown and described in my prior application, filed November 18, 1910, Serial No. 593047.

It comprehends certain improvements, hereinafter specified, in the construction of the guide brackets with which the shoe-carrying bar is associated, these improvements being of such a nature as to render the attachment specially applicable to the ordinary forms of wooden beam plow now in use, and to materially increase its strength, efficiency and durability.

A structural embodiment of the invention is illustrated in the accompanying drawings, wherein—

Figure 1 is a side elevation of the improved plow; Fig. 2 is an inverted plan view of Fig. 1; Fig. 3 is a detail perspective view of the plow standard; Fig. 4 is a fragmental perspective view of the lower portion of the sub-soiler; Fig. 5 is a transverse vertical sectional view, taken on the line 5—5 of Fig. 4; Fig. 6 is an enlarged fragmental perspective view of the upper guide bracket; Fig. 7 is a transverse vertical sectional view of Fig. 6; Figs. 8, 9 and 10 are enlarged perspective detail views of the lower guide bracket, wear plate, and landside; and Fig. 11 is a transverse vertical section, taken on the line 11—11 of Fig. 12.

The plow shown in said drawings is of the conventional "wooden-beam" type, and comprises, generally, the beam 1 and standard 2, and the point 3, mold-board 4, and landside 5, said parts being of the ordinary construction, for which reason they require no extended description. The right- and left-hand handles are indicated, respectively, by the numerals 6 and 7; these handles are connected together by the usual brace or cross-bar 8, and the first-mentioned handle is fastened at its lower end to the mold-board by the strap 9, while the corresponding end of the other handle is secured to a bolt 10 which passes through the landside.

The sub-soil attachment is located between the handles 6 and 7 and adjacent the rear end of the beam, its chief element being the vertical bar 11 which is formed along one edge with a series of notches 12 and carries at its lower end the shoe 13. As shown in Figs. 4 and 5, the bar terminates at its lower end in an enlargement or foot 14 that fits against the concave under face of the shoe and is bolted or otherwise suitably secured thereto, said shoe being formed with a slot 15 which opens through the rear edge thereof and receives said bar. Means is provided for raising and lowering the bar, such means being here shown as comprising the handle 16 secured to the upper bar end.

To guide the bar during its movements, upper and lower brackets 17 and 18 are employed. The bracket 17, shown in Figs. 6 and 7, preferably consists of two parts, namely, a body portion 19 and an end piece 20, the first-named part being formed with a slot 21 through which said bar extends, and the other part with a depending flange 22. The outer or left-hand end of the body portion 19 rests upon and is secured to the rear end of the beam, while the other end thereof rests upon the end piece 20, which latter is fastened by means of its flange 22 to the adjacent face of the handle 6. An adjustable connection between the parts 19 and 20 is provided, so as to permit the bracket to be attached to plows wherein the handles are set at varying angles to each other and to the beam, this being effected by forming the overlapping portions of said parts with coöperating cups 23 and 24 which fit each other and constitute, in effect, a ball-and-socket joint. The two cups are positively connected by a bolt 25 passed through registering openings 26 and 27 therein and carrying a headed nut 28 which bears against the under surface of the lower cup, the opening in that cup being necessarily of greater size than the opening in the upper cup. Bar 11 is normally forced toward the locking shoulder 29 produced by the forward end of slot 21 through the medium of the spring 30 located beneath bracket 17, as in the earlier construction, said spring being here shown as secured to handle 6; this arrangement provides for the automatic engagement of shoulder 29 in the notches 12 formed in the bar edge, as will be understood.

The lower guide bracket 18, shown in Fig. 8, is of integral construction, and its horizontal forward and rear portions 31 and 32 are preferably arranged in spaced parallel planes and are connected by a rearwardly and upwardly inclined intermediate portion 33, the first-named portion being formed at its landside edge with an upstanding flange 34 which is continued along the corresponding edge of the portion 33. The rear portion 32 is provided with a slot 35 through which bar 11 passes, said portion extending over and in spaced relation to the shoe 13, the latter being so disposed that its tip lies slightly to the rear of the point where the portions 31 and 32 meet. (See Fig. 1.) The flange 34 is arranged against the rear portion of the landside 5, and is fastened to the same by the bolts 10 and 36, the former bolt passing through the flange, landside and lower end of handle 7. The intermediate portion 33 is offset outwardly toward the furrow side of the plow, so as to dispose the portion 32 above shoe 13, as above stated, and said portion 33 is also widened somewhat. Finally, there is formed upon the bracket in question a strengthening rib 37 which extends around the furrow-side and rear edges thereof and upon the rear half of the landside edge, the flange 34 constituting a continuation of said rib and being provided with a forwardly and downwardly inclined shoulder 38 that serves as a seat for the lower end of the handle 7 to rest against.

Beneath the bracket 18 there is disposed a wear plate 39 shown in detail in Fig. 9. The front and rear portions 40 and 41 of this plate are made to fit directly against the lower surface of the portions 31 and 33 of said bracket, the two portions 41 and 33 being fastened together by a bolt 42, while the portion 40 terminates in a twisted projection or shoulder 43 that extends forwardly across the lower end of the standard 2 and is secured to the same by the bolt 44. By employing said plate, the lower bracket is completely protected against wear and at the same time is strengthened to a material extent by reason of its attachment thereto. When the plate itself becomes worn, it can readily be detached from the landside and the bracket, by merely removing the bolts 42 and 44, and replaced by a new part.

Considering the sub-soil attachment as a whole, and more especially the upper bracket, it will be seen that such element may be readily applied to any plow of the ordinary wooden beam type, irrespective of any variation in the angles at which the handles are set with reference to each other and to the beam, since the ball-and-socket joint between the parts or members of said element provides for a considerable range of adjustment. For the same reason, the attachment will accommodate itself to any slight changes or deviations from the normal which may be present as a result of the plow being dismembered and subsequently put together.

As regards the lower bracket, that element may likewise be attached to any of the conventional forms of landside in general use, and its arrangement and construction are such as to effectually strengthen said landside, and to steady the sub-soiler bar when the plow is running, the disposition of the shoe beneath and below the rear portion of said bracket, and to the rear and at one side of the heel of the landside affording perfect clearance for the trash or dirt thrown back by the shoe, so that choking between said shoe and landside will be completely obviated. The said shoe may be set at any desired depth in, or may be raised above, the ground by means of the handle connected to bar 11, and will be held in adjusted position by the action of the spring 30, which latter normally forces said bar toward the locking shoulder produced upon the upper guide bracket, as above described. The function and advantages of the wear plate 39 have already been set forth at length and require no further statement.

I claim as my invention:

1. A sub-soil attachment for plows comprising a vertically movable bar provided at its lower end with a shoe; a pair of guide brackets adapted for connection to the plow and provided with openings through which said bar extends, one of the brackets being arranged transversely of the plow and comprehending a pair of members connected together for angular adjustment in a horizontal plane relative to each other; and means for raising and lowering said bar.

2. A sub-soil attachment for plows comprising a vertically movable bar provided at its lower end with a shoe; a pair of guide brackets adapted for connection to the plow and provided with openings through which said bar extends, one of the brackets comprehending a pair of members having a ball-and-socket joint therebetween; and means for raising and lowering said bar.

3. A sub-soil attachment for plows comprising a vertically movable bar provided at its lower end with a shoe; a pair of guide brackets adapted for connection to the plow and provided with openings through which said bar extends, one of the brackets comprehending a pair of members having their mutually-adjacent ends overlapped and connected together for angular adjustment in a horizontal plane relative to each other; and means for raising and lowering said bar.

4. A sub-soil attachment for plows comprising a vertically movable bar provided at its lower end with a shoe; a pair of guide brackets adapted for connection to the plow and provided with openings through which said bar extends, one of the brackets compreof members connected together for angular adjustment in a horizontal plane.

16. The combination, with a plow provided with a pair of handles; of a guide bracket arranged between and transversely of said handles, said bracket comprising a pair of members connected together for angular adjustment in a horizontal plane relative to each other; and an endwise movable element engaged with said bracket and provided at its lower end with a ground treating implement.

In testimony whereof I have hereunto set my hand in presence of two subscribing witnesses.

CHARLES W. HICKS.

Witnesses:
CHARLES A. ROWE,
F. B. KEEFER.

Copies of this patent may be obtained for five cents each, by addressing the "Commissioner of Patents, Washington, D. C."